(12) United States Patent
Antonini

(10) Patent No.: US 8,124,216 B2
(45) Date of Patent: Feb. 28, 2012

(54) ADHESIVE BACKED SKINS AND GRIPS FOR HANDHELD DEVICES

(76) Inventor: Fred A. Antonini, Fort Worth, TX (US)

( * ) Notice: Subject to any disclaimer, the term of this patent is extended or adjusted under 35 U.S.C. 154(b) by 1342 days.

(21) Appl. No.: 10/524,367

(22) PCT Filed: Feb. 18, 2003

(86) PCT No.: PCT/US03/04690
§ 371 (c)(1),
(2), (4) Date: Feb. 11, 2005

(87) PCT Pub. No.: WO2004/050343
PCT Pub. Date: Jun. 17, 2004

(65) Prior Publication Data
US 2006/0154029 A1   Jul. 13, 2006

(51) Int. Cl.
*B32B 3/00* (2006.01)
*H04M 1/14* (2006.01)
*B65D 65/02* (2006.01)

(52) U.S. Cl. ........ 428/172; 428/187; 428/200; 428/204; 428/354; 455/575.1; 455/575.8; 379/437; 379/447; 379/451; 150/154; 150/165

(58) Field of Classification Search .............. 428/172, 428/187, 200, 204, 207, 343, 354; 379/437, 379/447, 451, 452, 454; 455/575.1, 575.8; 150/154, 165
See application file for complete search history.

(56) References Cited

U.S. PATENT DOCUMENTS

| | | |
|---|---|---|
| 4,302,852 A | 12/1981 | Joung |
| 4,552,713 A | 11/1985 | Cavicchioli |
| 4,986,496 A | 1/1991 | Marentic et al. |
| 5,054,063 A | 10/1991 | Lo et al. |
| 5,300,171 A | 4/1994 | Braun et al. |
| 5,508,084 A | 4/1996 | Reeves et al. |
| 5,654,050 A * | 8/1997 | Whalen-Shaw ............. 428/35.7 |
| 5,948,707 A | 9/1999 | Crawley et al. |
| 6,117,526 A * | 9/2000 | Marks ........................... 428/192 |
| 6,130,945 A | 10/2000 | Shin |

(Continued)

FOREIGN PATENT DOCUMENTS

EP    1293334 A1 *   3/2003

OTHER PUBLICATIONS

WO 00/08622, Feb. 2000.*

(Continued)

*Primary Examiner* — Donald J Loney
(74) *Attorney, Agent, or Firm* — James E. Walton; Richard G. Eldredge

(57) ABSTRACT

A skin (11) for use with a handheld electronic device is disclosed. The skin (11) includes a decorative layer, an anti-slip layer adhered over the decorative layer, and an adhesive layer disposed between the decorative layer and the anti-slip layer. The anti-slip layer has a surface finish (19) having a high coefficient of friction. The skin (11) is attached to the handheld electronic device by a layer of adhesive (16) on the back of the decorative layer. The skin (11) is selectively shaped to conform to the contours, shape, and components of the handheld electronic device. The skin (11) provides anti-slip and shock absorption functionalities to the handheld electronic device, but does not prevent or impede the handheld electronic device from mating with or connecting to corresponding accessory components.

15 Claims, 3 Drawing Sheets

U.S. PATENT DOCUMENTS

| | | |
|---|---|---|
| 6,270,902 B1 | 8/2001 | Tedeschi et al. |
| 6,372,323 B1 | 4/2002 | Kobe et al. |
| 6,383,607 B1 | 5/2002 | Shin |
| 6,465,091 B1 | 10/2002 | Ou-Yang |
| 6,564,397 B1 | 5/2003 | Hawley et al. |
| 6,840,836 B1 | 1/2005 | Siverson |
| 6,960,272 B1 | 11/2005 | Tokas et al. |

OTHER PUBLICATIONS

WO 01/87581, Nov. 2001.*

U.S. Appl. No. 10/523,942, Feb. 8, 2005, Fred A. Antonini.

Request for Continued Examination dated Nov. 15, 2010 from corresponding U.S. Appl. No. 11/072,382.

Amendment under 37 CFR 1.114 dated Nov. 15, 2010 from corresponding U.S. Appl. No. 11/072,382.

Decision on Appeal dated Sep. 19, 2010 from corresponding U.S. Appl. No. 11/072,382.

Request for Continued Examination dated Nov. 5, 2010 from corresponding U.S. Appl. No. 10/523,942.

Amendment under 37 CFR 1.114 dated Nov. 5, 2010 from corresponding U.S. Appl. No. 10/523,942.

Decision on Appeal dated Sep. 9, 2010 from corresponding U.S. Appl. No. 10/523,942.

* cited by examiner

ADHESIVE BACKED SKINS AND GRIPS FOR HANDHELD DEVICES

TECHNICAL FIELD

The present invention relates to handheld electronic devices. In particular, the present invention relates to thin, anti-slip protective skins or grips for handheld electronic devices to aid in handling.

DESCRIPTION OF THE PRIOR ART

Most handheld electronic devices, such as cellular telephones, camcorders, cameras, CD and MP3 players, PDA's, remote controls, notebook computers, tablet PC's, video games, video game controllers, hair trimmers and shears, and a wide variety of other handheld electronic devices, have housings that are made of hard, smooth materials, such as plastic and metal. Although some of these devices include hand grips and/or small rubberized components, they typically do not include any anti-slip material over a large portion of their housings. This is a problem, because when a user handles one of these devices, the slightest amount of perspiration, oil, or other moisture can allow the device to slip out of the user's hand, which can lead to the device being dropped and damaged. In addition, when these devices are placed on a table or other surface, they are vulnerable to sliding or being knocked off onto the floor or ground, which can also lead to breakage or permanent damage.

Most of handheld electronic devices have housings that are made of hard, smooth plastic or metal. The front faces of these housings usually include ornamental shapes and designs, but the rear faces are typically plain and smooth. Often, the rear, side, and bottom surfaces include switches, buttons, and access ports for receiving interchangeable components or batteries. These switches, buttons, and access ports leave exposed joints, seams, and grooves. Flip-type and swivel telephones also include integral plastic and metal hinges and swivels. In addition, many of these handheld electronic devices are configured to fit into accessory components, such as caddies, cradles, chargers, docking stations, carrying cases, and clips. When coupled together, there is usually very little clearance between the device and the accessory component. As a result, it is not possible to place a thick, anti-slip, shock absorbing material directly onto the device, as doing so would prevent or impede the device from properly mating with its accessory component.

SUMMARY OF THE INVENTION

There is a need for skins or grips for handheld electronic devices that provide anti-slip functionality.

Therefore, it is an object of the present invention to provide thin, anti-slip skins or grips for handheld electronic devices that are custom shaped to conform to the shapes of the housings of particular models of handheld electronic devices.

The skins or grips are custom shaped to cover large portions of the device, while accommodating joints, seams, and grooves in the housings. The skins are sufficiently thin to allow the handheld electronic devices to be connected to accessory components, such as caddies, cradles, chargers, docking stations, carrying cases, and clips without affecting the mating or connection between the devices and the accessory components. In addition to anti-slip functionality, the skins or grips may also provide some shock absorption functionality.

The skins or grips according to the present invention can be applied to existing handheld electronic devices, or can be manufactured as integral portions of handheld electronic devices of original manufacture.

DESCRIPTION OF THE PREFERRED EMBODIMENT

The present invention is a thin, anti-slip, shock absorbing, protective skin or grip that is custom cut and shaped to fit a particular model of a particular handheld electronic device. These handheld electronic devices include cellular telephones, camcorders, cameras, CD and MP3 players, PDA's, remote controls, notebook computers, tablet PC's, video games, video game controllers, hair trimmers and shears, and a wide variety of other devices with housings that are made of relatively hard materials, such as plastics and metals. It will be appreciated that the present invention may be used on any device in which anti-slip functionality is desired, regardless of whether the device is a handheld electronic device. The skins and grips of the present invention will be referred to herein as "skins."

In the preferred embodiment, the skin of the present invention is an adhesive backed skin that is adhered to the housing of the handheld electronic device. The material and surface finish or texture of the skin provide a high coefficient of friction when held in a user's hand or placed on most surfaces. This high coefficient of friction aids in gripping and handling the handheld electronic device. The skins are configured to fit over a large area of the device, usually on the rear surface of the device and on or around the sides and edges of the device. The skins are custom cut and shaped to fit particular surfaces of handheld electronic devices, i.e., front, back, top, bottom, sides, and edges. In addition, treating a handheld electronic device with skins according to the present invention allows the device to be placed on most surfaces, even on inclined surfaces at angles to the horizontal of up to 80°, with a reduced risk that the device will slide off and break or be damaged. As such, the skin accommodates exposed joints, seams, grooves, and hinges on the device.

In addition to providing anti-slip functionality, the material and surface finish or texture of the skin may also provide a moderate amount of shock absorption, due to the compliance of the material and surface finish or texture. For each skin, the thickness of the material, the type of material used, the surface finish and texture of the material, the shape of the material, and the placement of skin on the handheld electronic device all combine to provide the shock absorption functionality of the present invention.

Figure 1:
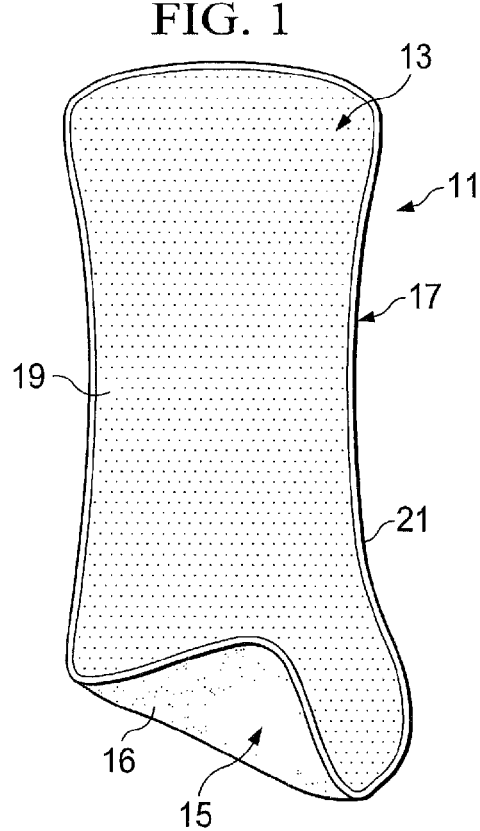
FIG. 1 is a top view of the preferred embodiment of a skin or grip according the present invention.

Referring to FIG. 1 in the drawings, the preferred embodiment of an adhesive backed skin for a handheld electronic device according to the present invention is illustrated. A skin 11 includes a front surface 13, an opposing rear surface 15, and a periphery 17 having a selected shape and dimensions. It is preferred that skin 11 be made of a thin, flexible material about 0.5 millimeters or less in thickness. However, it will be appreciated that in some applications, the clearance between the handheld electronic device and its accessory components may allow for a skin 11 having a thickness of greater than 0.5 millimeters. Front surface 13 includes a surface finish or texture 19 that provides a high coefficient of friction. Surface finish 19 and the type of material chosen for skin 11 provides the anti-slip functionality of the present invention. In the preferred embodiment, surface finish 19 is smooth, but provides a high coefficient of friction, even in the presence of moisture. As such, surface finish 19 is homogenous or continuous in nature, such as a suede finish, a matte finish, or a gloss finish. The type, thickness, surface finish, texture, and shape of skin 11, and the placement of skin 11 on the handheld electronic device, all combine to provide the shock absorption functionality of the present invention. Liquid silicone resin and thermoplastic rubber are particularly well suited as materials for skin 11.

Rear surface 15 includes a thin layer or coating of adhesive 16 so that skin 11 may be adhered to the surface of the handheld electronic device. Adhesive layer 16 may be a thin sheet of double stick tape or pressure sensitive adhesive, and is preferably protected prior to installation of skin 11 onto a handheld electronic device by a sheet or roll of protective peel-away paper, plastic, or other suitable material, such as sheet 47 (see FIG. 2). Adhesive layer 16 may be permanent or removable. It is preferred that, in applications where skin 11 is removable from the handheld electronic device, adhesive layer 16 not leave any adhesive or residue on the surface of the handheld electronic device when skin 11 is removed.

It is preferred that periphery 17 be edge treated at edge 21 by stamping, laser cutting, or other suitable means to prevent splitting, cracking, peeling, or shredding of skin 11 after installation onto the surface of a handheld electronic device. It will be appreciated that skin 11 may be manufactured in a wide variety of color schemes and designs, including solid, transparent, opaque, translucent, graphic, or any combination thereof, as explained in more detail below.

It is important that skin 11 be thin, so that after installation onto the housing of a handheld electronic device, the operation of the device is not impeded, i.e., the handheld electronic device remains able to properly connect to, mate with, and interface with any of its accessory components, such as caddies, cradles, chargers, docking stations, carrying cases, and clips. It is also important that the shape and configuration of skin 11 be custom cut for particular models of handheld electronic devices, so that access ports, joints, seams, grooves, and hinges are accommodated.

Figure 2:
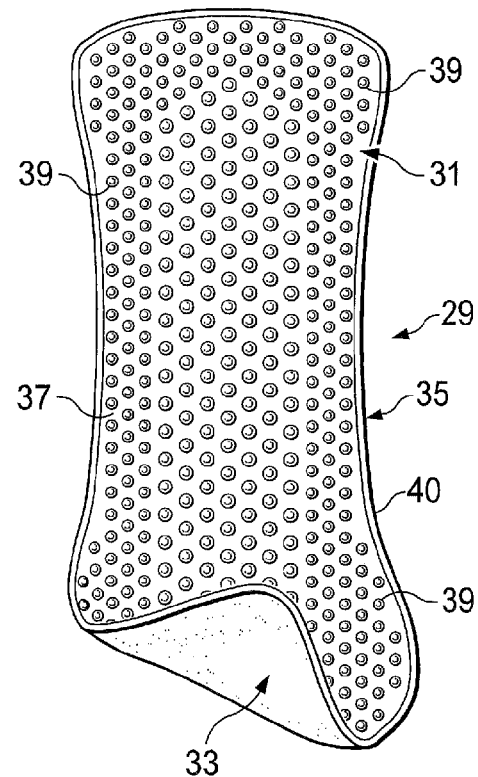
FIG. 2 is a top view of an alternate embodiment of the skin or grip according to the present invention.

Referring now to FIG. 2 in the drawings, an alternate embodiment of the skin according to the present invention is illustrated. In this embodiment, a skin 29 includes a front surface 31, an opposing rear surface 33, and a periphery 35 having a selected shape and dimensions. It is preferred that skin 31 be made of a thin, flexible material about 0.5 millimeters or less in thickness. However, it will be appreciated that in some applications, the clearance between the handheld electronic device and its accessory components may allow for a skin 11 having a thickness of greater than 0.5 millimeters. This embodiment is similar to the preferred embodiment described above, with the exception that smooth surface finish 19 is replaced with a non-smooth surface finish 37. In this example, non-smooth surface finish 37 includes a plurality of upraised circular members or bumps 39 placed in a generally random pattern with larger upraised bumps 39 in the center and smaller upraised members or bumps 39 near periphery 35.

It will be appreciated that non-smooth surface finish 37 may include any combination of upraised bumps 39, inwardly protruding dimples or depressions, upraised or inwardly protruding ridges, or any of a wide variety of conventional texturing shapes and configurations. Non-smooth surface finish 37 may have a repeating pattern, or may be random in nature. It will be appreciated that non-smooth surface finish 37 may include a combination of texturing shapes and sizes, such as smooth portions and small and large upraised bumps combined with curved inwardly protruding ridges. As with the preferred embodiment of FIG. 1, periphery 35 is edge treated at edge 40 by stamping, laser cutting, or other suitable means to prevent splitting, cracking, peeling, or shredding of skin 29 after installation onto the surface of a handheld electronic device.

Figure 3:
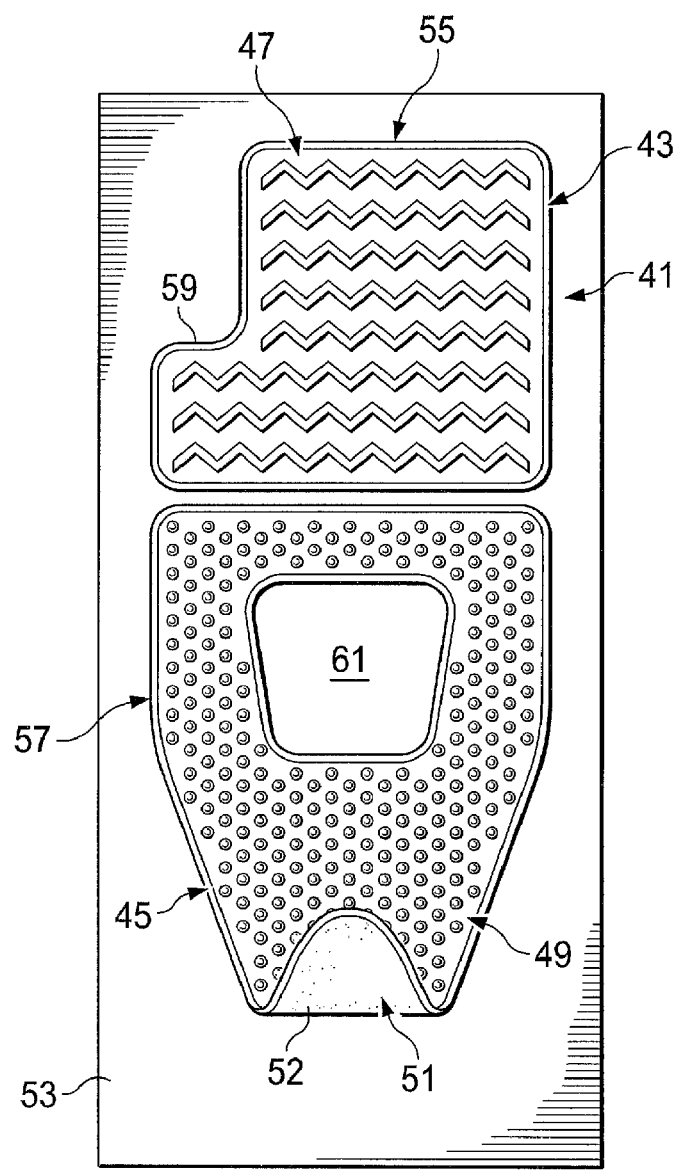
FIG. 3 is a top view of another alternate embodiment of the skin or grip according to the present invention carried by a sheet or roll of protective peel-away paper.
Figure 4:
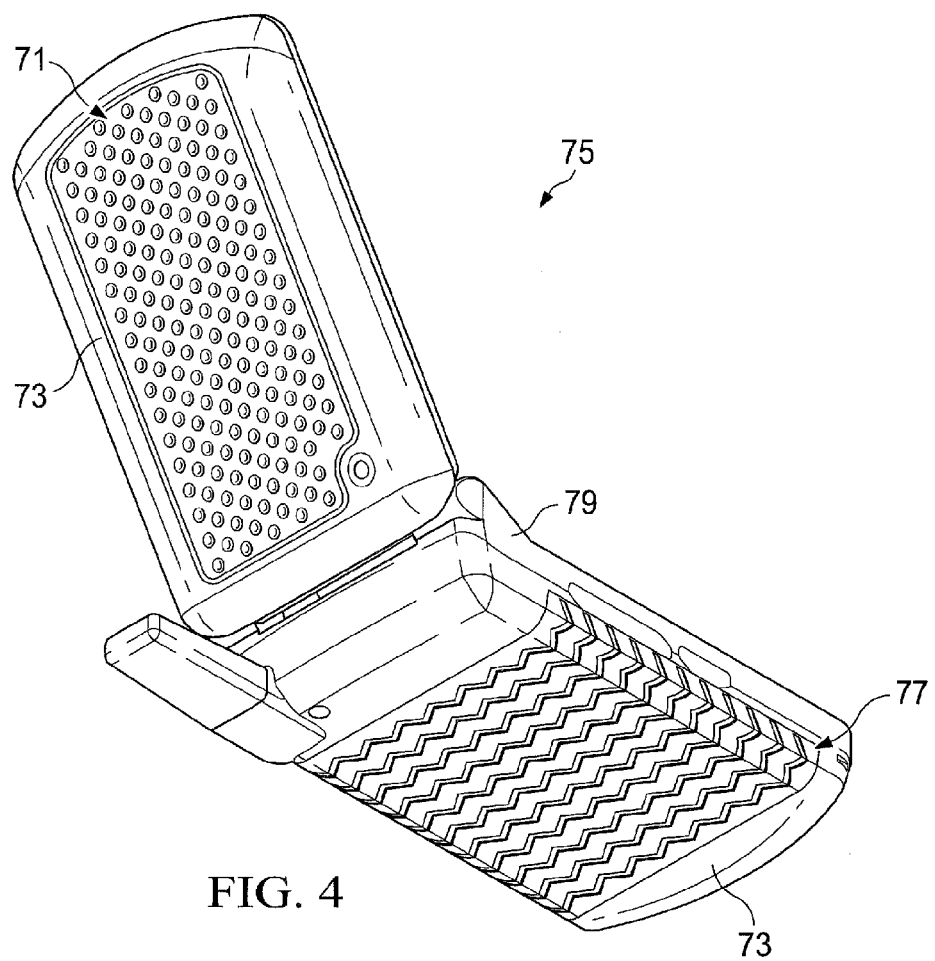
FIG. 4 is a perspective view of another alternate embodiment of the skin or grip according to the present invention applied to the housing of a flip-type cellular telephone.

Referring now to FIG. 3 in the drawings, another alternate embodiment of the present invention is illustrated. In this embodiment, a skin 41 is a multi-piece skin having a first portion 43 and a second portion 45. It should be understood that first portion 43 and second portion 45 may be completely separate pieces, or may be partially attached to each other, such as by perforation. First portion 43 includes a front surface 47 and a rear surface (not shown). Second portion 45 includes a front surface 49 and a rear surface 51. Rear surface 51 includes a layer or coating of adhesive 52 for attaching skin 41 to a handheld electronic device as described above. As is shown, skin 41 is still attached to a protective sheet of peel-away paper 53 that protects the layer of adhesive 52 that is disposed on rear surface 51. It will be appreciated that paper 53 may be a continuous roll accommodating many separate skins 41.

Both first portion 43 and second portion 45 include a surface finish 54. As is shown, surface finish 54 may include upraised bumps, wavy ribs, or a wide variety of textured patterns and combinations. In addition, first portion 43 and second portion 45 include peripheries 55 and 57, respectively, that are edge treated by stamping, laser cutting, or other suitable means to prevent splitting, cracking, peeling, or shredding of skin 41 after installation onto the surface of a handheld electronic device.

In this embodiment, first portion 43 includes a cut-away portion 59 and second portion 45 tapers inwardly to provide a custom fit for a particular handheld electronic device. Such a multi-piece design is particularly well suited for application to a flip-type cellular telephone. As is shown, second portion 45 includes a void space 61 that is located and shaped to accommodate an access port on the handheld electronic device, such as a battery port, communication jack, or other conventional access port.

In operation, skin 41 is peeled away from protective sheet 53 and adhered onto the surface of the handheld electronic device. It should be understood that skin 41 may be further shaped or cut by the user to create a desired effect or functionality. Once applied, skin 41 provides anti-slip functionality and a moderate amount of shock absorption. As such, the user will have more handling control of the device, even in the presence of perspiration or other moisture, and skin 41 allows the handheld electronic device to be placed on a smooth table, even on an inclined surface, with a reduced risk that the device will slide off and break or be damaged.

Referring now to FIG. 3 in the drawings, a skin 71 is shown attached to the rear surface 73 of a cellular telephone 75. Although telephone 75 is shown as a flip-type cellular telephone, it will be appreciated that telephone 75 represents all of the handheld electronic devices described herein, such as telephones, camcorders, cameras, CD and MP3 players, PDA's, remote controls, notebook computers, tablet PC's, video games, video game controllers, hair trimmers and shears, and any other handheld devices having a housing that lacks adequate anti-slip functionality. As is shown, a second skin 77 is attached to rear surface 73 of telephone 75 and wraps around an edge surface 79 of telephone 75.

It should be understood that the skins according to the present invention may be manufactured and sold separately from the handheld devices, or may be installed on the handheld devices during original manufacture. It should also be understood that the skins according to the present invention may be integral with the housing or a component of the handheld device. For example, a skin according to the present invention may be manufactured with, attached to, or integral with an aftermarket cellular telephone battery that clips onto the cellular telephone.

Figure 5:
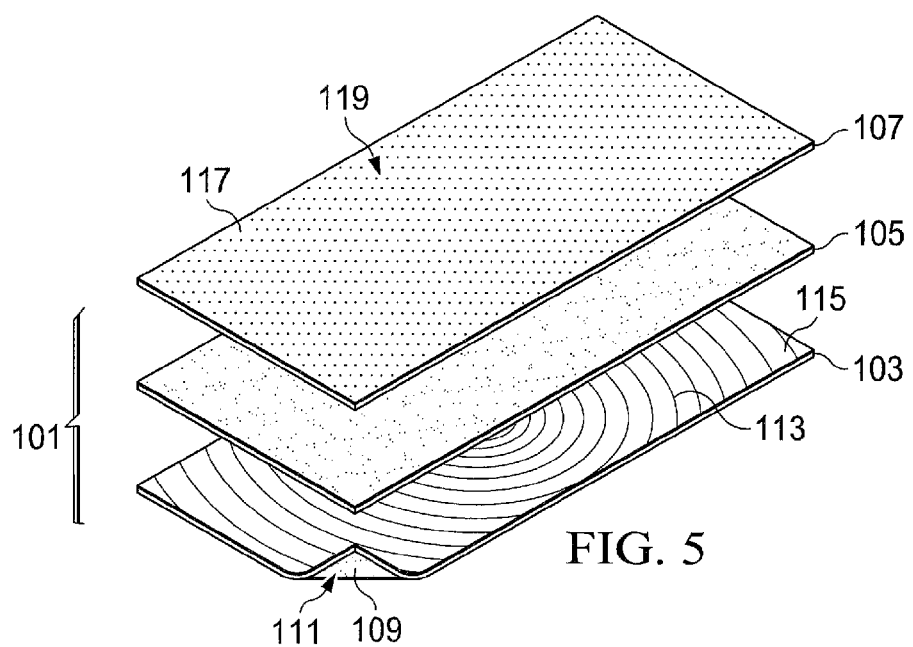
FIG. 5 is a schematic illustrating the preferred embodiment of manufacturing a graphics version of the skins or grips according to the present invention.

Referring now to FIG. 5 in the drawings, a schematic of the preferred embodiment of manufacturing a graphics version of the skins or grips according to the present invention is illustrated. In this schematic, a skin 101 is represented by a plurality of separate layers 103, 105, and 107. Layers 103, 105, and 107 are shown in FIG. 5 with enlarged thicknesses for clarity. Layer 103 represents a label stock or film, layer 105 represents an adhesive material, and layer 107 represents a material or film having a high coefficient of friction.

Layer 103 preferably includes a coating of adhesive 109 on an underneath surface 111. In applications where skin 101 is removable from the handheld electronic device, adhesive 109 does not leave any adhesive or residue on the surface of the handheld electronic device when skin 101 is removed. In the preferred embodiment, a graphical image 113 has been printed or placed on an upper surface 115 of layer 103; however, it will be appreciated that layer 103 may be transparent or translucent label stock. Graphical image 113 may be any visual indicia, including text, pictures, portraits, patterns, designs, or any combination thereof, and may be presented in any of a wide variety of color schemes. In addition, layer 103 may include metallized, holographic, light activated, or photo luminescent materials or graphics that glow in the dark or are otherwise affected by environmental factors or surroundings.

Layer 105 represents a coating, doping, or treatment of layer 103 with an adhesive. Adhesive layer 105 aids in adhering layer 107 to layer 103.

Layer 107 is preferably a cured elastomeric film. Layer 107 includes a surface finish or texture 117 on an upper surface 119. Surface finish 117 is the same as surface finishes 19, 37, and 54. As such, surface finish 117 may be smooth or non-smooth. It will be appreciated that a softer material may be chosen for layer 107 to provide additional shock absorption capacity. It is preferred that adhesive layer 105 and elastomer layer 107 be transparent or translucent so that graphical image 113 may be visible through adhesive layer 105 and elastomer layer 107. It will be appreciated that surface finish 117 may also include polarization features, so that graphical image 113 appears differently as it is viewed from different angles. As set forth above, liquid silicone resin and thermoplastic rubber are particularly well suited as materials for layer 107 and skin 101.

Layers 103, 105, and 107 are combined together in a bonding process, such as a pressure bonding, laminating process, a heat treatment process, or a combination of similar processes. This allows the anti-slip and shock absorption functionalities of layer 107 to be combined with the decorative features layer 103. It should be understood that the foregoing multi-layered manufacturing process is merely one of a wide variety of possible manufacturing techniques that will produce the anti-slip skins of the present invention.

Many different versions of skin 101 may be created by combining the features of each of the layers 103, 105, and 107. For example, the following versions can be created: (1) a clear version created from a transparent label stock 103, a transparent adhesive layer 105, and a transparent anti-slip layer 107; (2) a decorative version created from a decorative label stock 103, a clear adhesive layer 105, and a decorative anti-slip layer 107; and (3) a highly graphical version created from a graphical label stock 103, a clear adhesive layer 105, and a polarized anti-slip layer 107.

Although the present invention is particularly well suited for an aftermarket application, it should be understood that the present invention may be used with handheld devices of original manufacture. The skins of the present invention may be manufactured and sold separately as an aftermarket product for application to handheld electronic devices, or the skins may be applied to products of original manufacture. In addition, it should be appreciated that the skins according to the present invention may be integral to the actual handheld electronic devices or their components, such as batteries, face plates, covers, and housings.

It is apparent that an invention with significant advantages has been described and illustrated. Although the present invention is shown in a limited number of forms, it is not limited to just those forms, but is amenable to various changes and modifications without departing from the spirit thereof.

The invention claimed is:

1. A skin for use with a handheld electronic device comprising:
   a separate decorative layer formed of label stock, directly onto which is printed graphical indicia, the decorative layer having:
      an underneath surface and an upper surface;
   a non-molded anti-slip layer adhered to the upper surface of the decorative layer via an adhesive material, the anti-slip layer having:
      a soft pliable non-abrasive top surface finish having a high coefficient of friction so as to restrict movement of the handheld electronic device relative to a hard non-pliable contact surface which the handheld electronic device is placed thereupon so as to prevent slipping, the top surface having:
         a center section; and
         a periphery section extending around the center section; and
      a plurality of upraised circular members protruding from the top surface finish of the anti-slip layer, the plurality of upraised circular members being configured to cover the entire center section and the periphery section of the top surface finish of the anti-slip layer, the plurality of upraised circular members having:
         a plurality of larger upraised circular members covering the entire center section of the top surface; and
         a plurality of smaller upraised circular members covering the entire periphery section of the top surface;
      a plurality of curved ridges inwardly protruding from the top surface finish of the anti-slip layer; and
   an adhesive layer disposed between the decorative layer and a surface on the handheld electronic device for adhering the skin to the handheld electronic device;
   wherein the skin is selectively shaped to conform to the contours, shape, and components of the handheld electronic device; and
   wherein the graphical indicia is visible through the anti-slip layer.

2. The skin according to claim 1, wherein the combined thickness of the decorative layer and the anti-slip layer is less than about 0.5 millimeters.

3. The skin according to claim 1, wherein the decorative layer and the anti-slip layer are transparent.

4. The skin according to claim 1, wherein the surface finish includes at least two of the following features:
  (a) upraised bumps;
  (b) depressed bumps;
  (c) upraised ridges;
  (d) depressed ridges; and
  (e) void spaces.

5. The skin according to claim 1, wherein the anti-slip layer is formed of a compressible material such that the anti-slip layer provides shock absorption.

6. The skin according to claim 1, wherein the anti-slip layer is polarized such that an image on the decorative layer changes when viewed from different angles.

7. The skin according to claim 1, wherein the anti-slip layer is formed from liquid silicone resin.

8. The skin according to claim 1, wherein the anti-slip layer is formed from thermoplastic rubber.

9. The skin according to claim 1, wherein the anti-slip layer is formed from cured elastomeric film.

10. A skin for use with a handheld electronic device having an access port, the skin comprising:
  a first portion;
  at least one additional portion;
  wherein the first portion and each additional portion comprise:
    a separate decorative layer formed of label stock, directly onto which is printed graphical indicia;
    an anti-slip layer adhered over the decorative layer, the anti-slip layer having:
      a soft pliable non-abrasive top surface finish having a high coefficient of friction so as to restrict movement of the handheld electronic device relative to a hard non-pliable contact surface, the top surface having:
        a center section; and
        a periphery section extending around the center section; and
      a plurality of upraised rounded dimples protruding from the top surface finish of the anti-slip layer, the plurality of upraised dimples being integral with the surface of the anti-slip layer, the plurality of upraised dimples being applied to the entire center section and the periphery section of the top surface finish of the anti-slip layer, the plurality of upraised circular members having:
        a plurality of larger upraised dimples covering the entire center section of the top surface; and
        a plurality of smaller upraised dimples covering the entire periphery section of the top surface;
      a void space positioned over the access port; and
      a plurality of curved ridges inwardly protruding from the top surface finish of the anti-slip layer; and
    an adhesive layer disposed between the decorative layer and the handheld electronic device for adhering the skin to the handheld electronic device;
  wherein the first portion and each additional portion are selectively shaped to conform to the contours, shape, and components of the handheld electronic device.

11. The skin according to claim 10, wherein the first portion and the second portion are adapted to be separated from each other prior to attachment to the handheld electronic device.

12. The skin according to claim 10, wherein at least the first portion or one of the additional portions is less than about 0.5 millimeters thick.

13. The skin according to claim 10, wherein either the first portion or one of the additional portions is formed from liquid silicone resin.

14. The skin according to claim 10, wherein either the first portion or one of the additional portions is formed from thermoplastic rubber.

15. The skin according to claim 10, wherein either the first portion or one of the additional portions is formed from a cured elastomeric film.

* * * * *